United States Patent [19]

Chew, II et al.

[11] Patent Number: 4,921,369

[45] Date of Patent: May 1, 1990

[54] CONNECTOR FOR PORTABLE FURNITURE INCLUDING A BED AND A CHILD ENCLOSURE

[76] Inventors: Bonnie G. Chew, II, 232 Beech Cir., Birmingham, Ala. 35213; Third Alabama Bank, executor, P.O. Box 10247, Birmingham, Ala. 35202

[21] Appl. No.: 244,637

[22] Filed: Sep. 12, 1988

Related U.S. Application Data

[63] Continuation of Ser. No. 771,046, Aug. 30, 1985, abandoned.

[51] Int. Cl.⁵ .................... A47D 7/00; F16B 12/36; E04H 15/42
[52] U.S. Cl. .................... 403/171; 403/174; 403/176; 403/178; 403/295; 5/99 C; 5/99 R; 135/98; 135/106; 135/116
[58] Field of Search ............ 5/98 R, 99 R, 99 A, 5/99 B, 99 C; 135/87, 106, 116; 403/171, 174, 176, 178, 295

[56] References Cited

U.S. PATENT DOCUMENTS

| | | | |
|---|---|---|---|
| 1,020,998 | 3/1912 | Mattes | 5/113 |
| 2,153,547 | 4/1939 | Charlop et al. | 135/87 X |
| 2,464,866 | 3/1949 | Holtz | 5/98 R |
| 2,491,036 | 12/1949 | Dodge | 5/99 A |
| 2,590,315 | 3/1952 | Hawley, Jr. | 5/98 B |
| 2,681,456 | 6/1954 | Schiemer | 5/99 C |
| 2,784,420 | 3/1957 | Moltane | 5/98 R |
| 2,922,653 | 1/1960 | O'Brien | 403/171 X |
| 3,050,745 | 8/1962 | Tabbert | 5/63 X |
| 3,105,505 | 10/1963 | Maybee | 135/113 X |
| 3,165,760 | 1/1965 | Abajian | 5/99 R |
| 3,174,161 | 3/1965 | Black | 5/63 X |
| 3,176,428 | 4/1965 | Slingluff | 403/176 X |
| 3,206,772 | 9/1965 | Sarasin | 5/99 R |
| 3,424,178 | 1/1969 | Yazaki | 135/106 |
| 3,532,369 | 10/1970 | Reilly | 403/176 |
| 3,924,280 | 12/1975 | Vaiano | 5/99 R |
| 4,070,716 | 1/1978 | Satt et al. | 5/99 C |
| 4,538,309 | 9/1985 | Gunter | 5/99 B |

FOREIGN PATENT DOCUMENTS

| | | | |
|---|---|---|---|
| 1249598 | 9/1967 | Fed. Rep. of Germany | 403/295 |
| 802824 | 6/1936 | France | 403/174 |
| 1557841 | 12/1967 | France | 5/99 R |
| 2006297 | 5/1979 | United Kingdom | 403/176 |

*Primary Examiner*—Carl D. Friedman
*Assistant Examiner*—Lan Mai
*Attorney, Agent, or Firm*—Staas & Halsey

[57] ABSTRACT

The present invention includes a connector having rods with keys thereon. The keys engage slot in tubes comprising a frame for portable furniture. The connector also includes a foot which will apply a releasable breaking force to a surface supporting the portable furniture. The present invention also includes a portable bed using the connector invention and the inward suspension of the playpen. The present invention also includes a child enclosure using the connector of the present invention and suspended inwardly from horizontal support members.

29 Claims, 7 Drawing Sheets 4,921,369

CONNECTOR FOR PORTABLE FURNITURE INCLUDING A BED AND A CHILD ENCLOSURE

CROSS REFERENCE TO RELATED APPLICATIONS

This is a continuation-in-part of co-pending application Ser. No. 771,046 filed on Aug. 30, 1985.

BACKGROUND OF THE INVENTION

1. Field of the Invention

The present invention is related to a connector for lightweight portable furniture or other apparatus which, during assembly, has members which tend to twist, and, more particularly, to a connector which includes means for preventing rotation of tubes connected thereto and a releasable brake which keeps the furniture from sliding around, but will not cause the furniture to tip over.

2. DESCRIPTION OF THE RELATED ART

Portable furniture such as a portable playpen described in U.S. application Ser. No. 551,104 includes a frame which is relatively easy to assemble and disassemble. The frame is generally made of lightweight strong hollow aluminum tubing which frictionally fits over a connector between the frame tubes. The various tubes of the frame must be held in a vertical position during assembly and tend to fall over, making assembly of the playpen extremely difficult and frustrating unless two people are available for assembly. In addition, the playpen, can slide across the floor on the lightweight highly polished aluminum type frame tube, and, as a result, a baby in the playpen could reach objects on adjacent surfaces or cause the playpen to tumble down the stairs. The provision of rubber covers for the tubes to prevent sliding allows the playpen to tip over when a child leans against a side. Thus, there is a need in such portable furniture for a connector which facilitates assembly and which prevents the furniture from sliding across the floor yet does not cause the furniture to tip over.

SUMMARY OF THE INVENTION

It is an object of the present invention to provide a connector which facilitates assembly of portable furniture.

It is a further object of the present invention to provide a connector which prevents rotation of portable furniture frame members.

It is an additional object of the present invention to provide a connector which applies a releasable breaking force to an adjacent surface.

It is another object of the present invention to provide a portable bed using the connector.

It is still another object of the present invention to provide a child enclosure having a compartment suspended inwardly from a frame and having no hard surfaces which will contact the child.

The present invention includes a connector having rods with keys thereon. The keys engage key slots in tubes comprising a frame for disassemblable portable furniture. The connector also includes a foot which will apply a releasable breaking force to a surface supporting the portable furniture. The present invention further includes a portable bed using the connector of the present invention and the inward suspension of the playpen. The present invention additionally includes a child enclosure using the connector of the present invention and having a fabric compartment suspended inwardly from horizontal support members.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
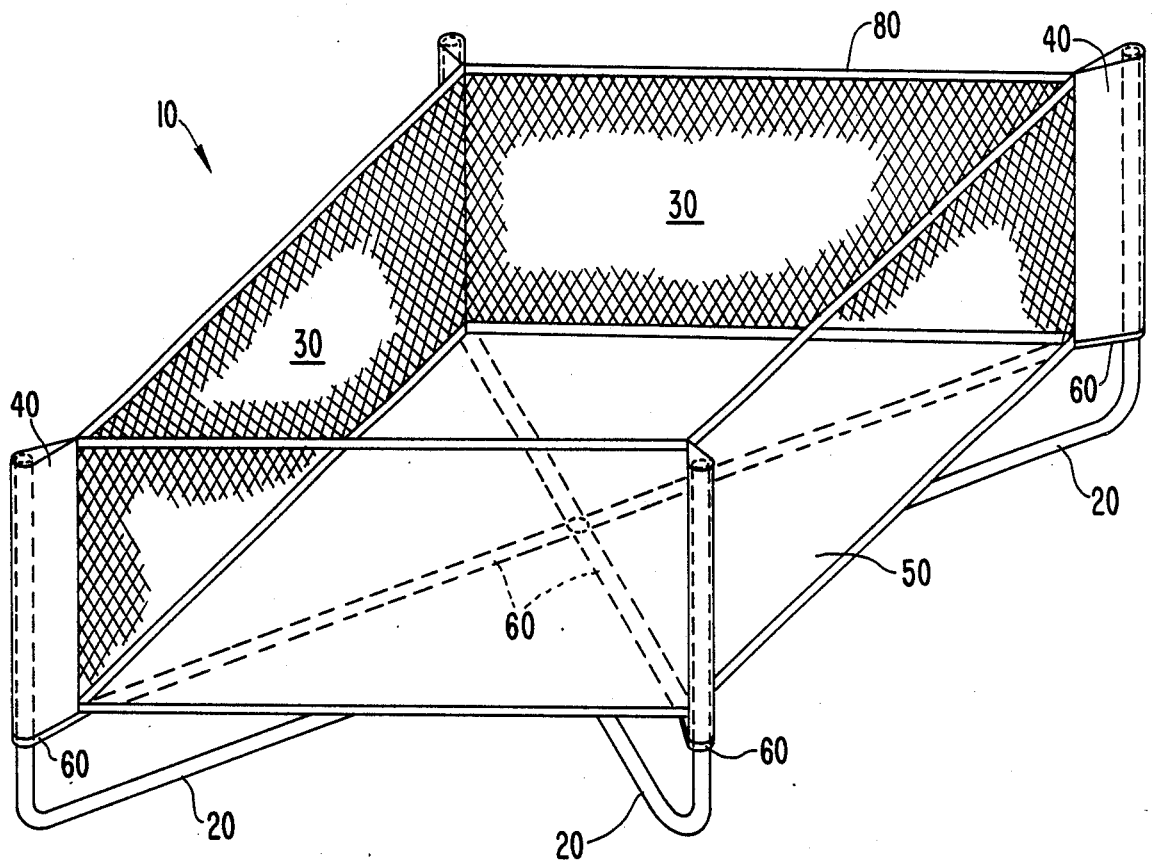
FIG. 1 illustrates a portable playpen 10 with a disassemblable frame.

FIG. 1 illustrates a portable playpen 10 which includes tubular frame members 20 which engage a suspended child enclosure including flexible mesh sides 30, vertical side supporting sleeves 40, and a bottom 50 including support straps 60. The box-like mesh child enclosure is vertically suspended inwardly from the vertical portions of the frame members 20. The inward and upward suspension of the enclosure away from the hard surfaced frame members 20 prevents a child from being injured when the child comes into forceful contact with the sides and corners of the enclosure. The details of construction and assembly of the playpen of FIG. 1 can be found in U.S. application Ser. No. 551,104. When assembling the playpen 10, the side support members 40 must be slid over the frame tubes 20 one at a time. Gravity tends to make the tubes 20 fall over so they must be held upright by more than one person during assembly.

Figure 2:
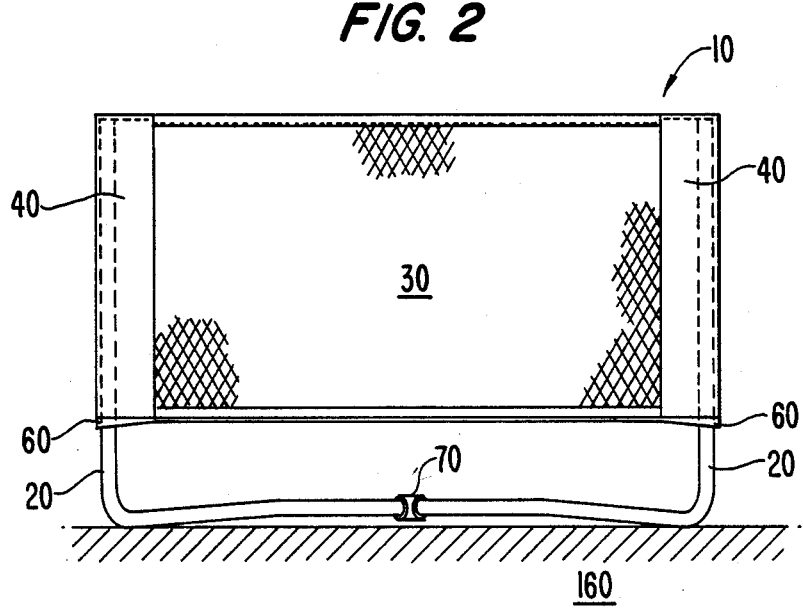
FIG. 2 is a side view of the playpen 10 illustrating the position of a connector 70 according to the present invention.
Figure 3:
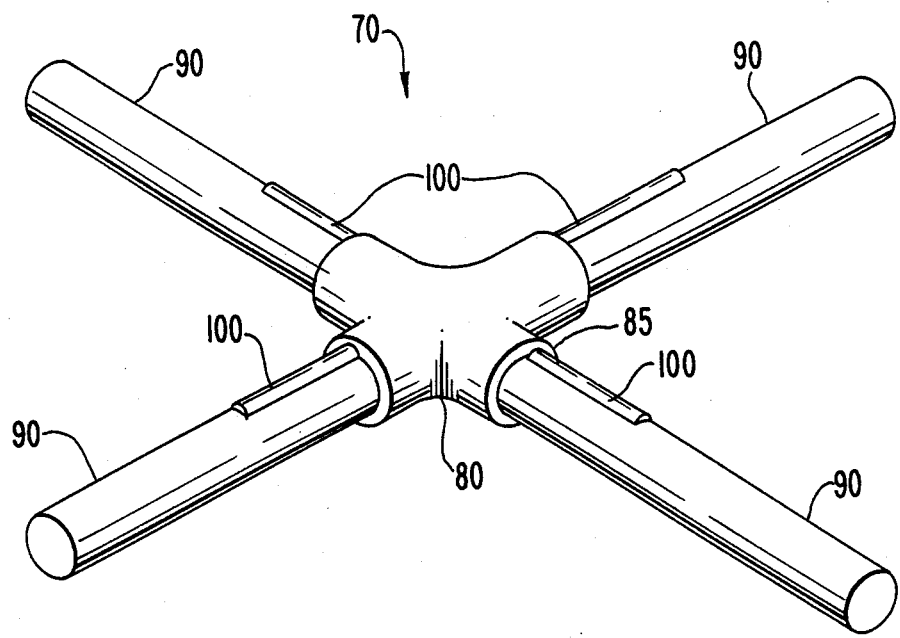
FIG. 3 is a detailed perspective view of a connector 70 according to the present invention.
Figure 4:
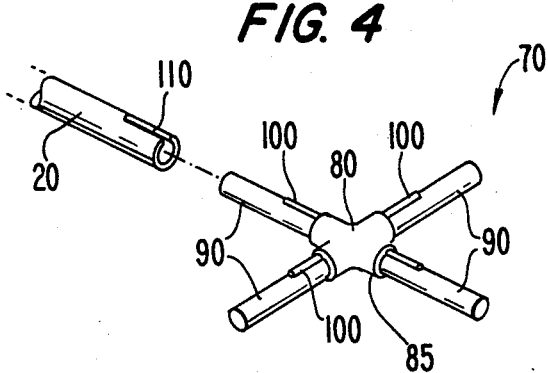
FIG. 4 illustrates the relationship between a frame tube 20 and a connector 70.
Figure 5:
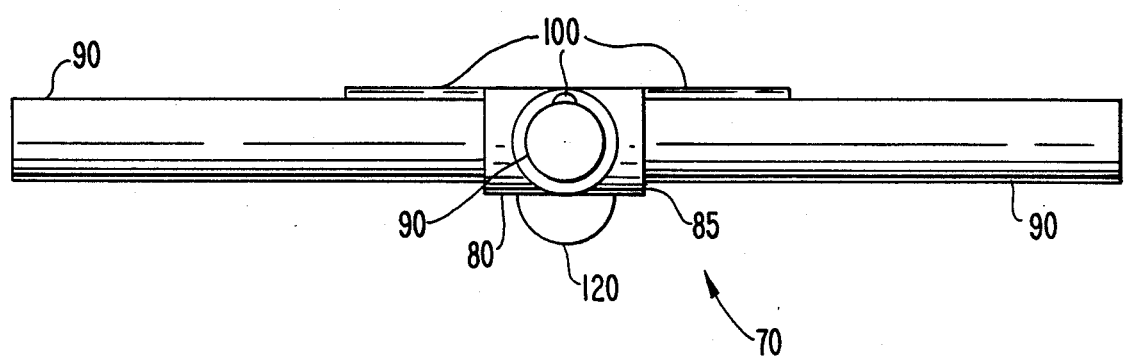
FIG. 5 is a side view of connector 70.

FIG. 2 illustrates the location of a connector 70 according to the present invention which couples the tubes 20 of the frame. A detailed perspective view of the cast aluminum connector 70 including a cross member 80, a shoulder 85 and four rods 90 is illustrated in FIG. 3. Each rod 90 includes a key 100 for slidably engaging a slot 110 in each tube 20 of the frame as illustrated in FIG. 4. The slot 110 and key 100 prevent the tube 20 from rotating relative to the connector during the assembly of the playpen 10. The shoulder 85 abuts the ends of the tubes as illustrated in FIGS. 2, 7, 8 and 13. FIG. 5 illustrates a side view of the cast aluminum connector 70 showing an optional reinforcing member 120 which provides additional support for the connector 70 when under the expected flexing stress. The preferred dimensions for the rod are 3 inches in length and $\frac{1}{2}$ inch in diameter and fit a $\frac{3}{4}$ inch tube 20 that provides adequate support for the occupants of the portable furniture while giving the connection 70 enough bulk and strength to provide the connection for the tubes 20. The key is preferably $\frac{3}{4}$ inch in length and has a height of $\frac{1}{8}$ inch but should be at least as thick as the thickness of the tube with which it engages. The cross member 80 is approximately 1 inch in length and 5/8 of an inch high, however, it is possible to eliminate the cross member 80 if the rods are thick enough. As discussed above, the connector is preferably cast aluminum made using an ordinary aluminum casting operation so that the furniture will be light in weight. Other materials such as steel and plastic may be used as long as the connector will not break when flexed under expected loads.

Figure 6:
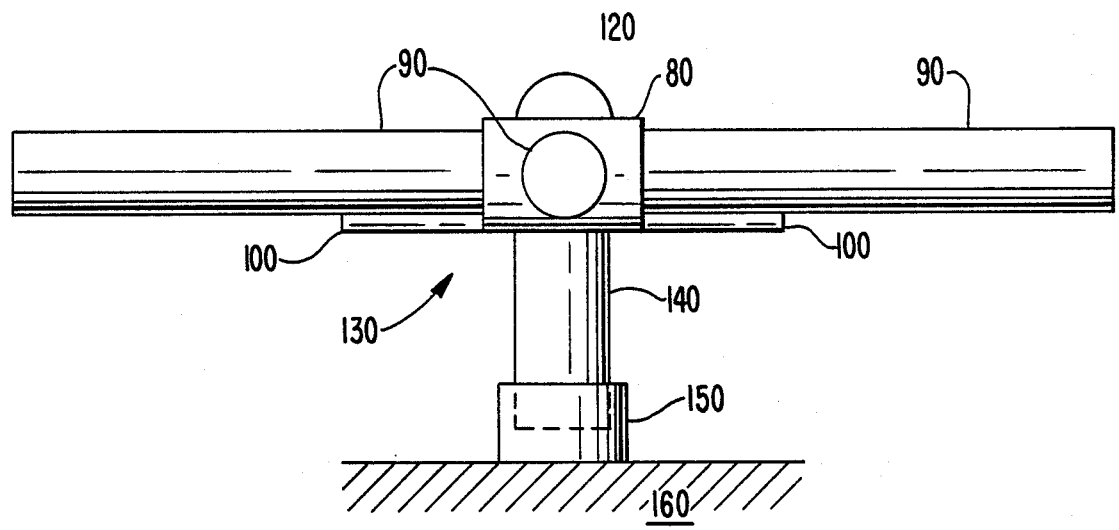
FIG. 6 illustrates another connector 130 according to the present invention.
Figure 7:
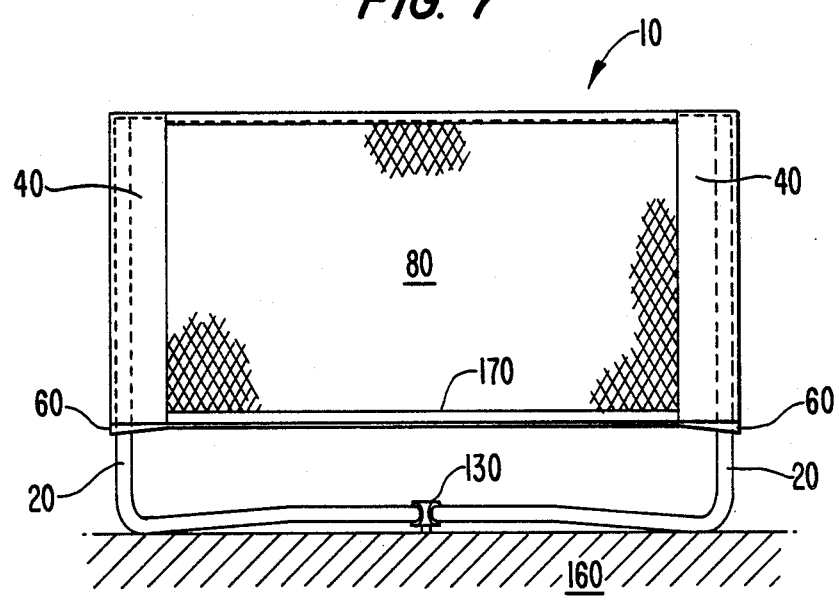
FIG. 7 is a side view of a playpen 10 with the connector 130 of FIG. 6.

FIG. 6 illustrates a second connector 130 which includes a foot 140 and a rubber tip 150 which acts as a brake by applying a frictional force to floor 160. The brake prevents the playpen 10 or other portable furniture from sliding across slick surfaces when the occupant moves. The brake also acts as a releasable brake whenever the playpen 10 is tilted by a baby standing against the side. When the baby leans against the side, the playpen 10 has a tendency to tilt thereby removing the contact between the floor 150 and the rubber brake 140 allowing the playpen 10 to slide slightly thereby preventing the playpen 10 from tilting over. The foot 130 is preferably 1$\frac{1}{4}$ inches long and $\frac{1}{2}$ inch in diameter. The rubber tip 140 can be made of neoprene or some other high coefficient of friction material. FIG. 7 illustrates the playpen 10 with a connector 130 brake contacting the floor 160. As can be seen in FIG. 7, the bottom of the playpen 170 is held well above the connector 130 so that the occupant does not contact the connector or frame.

Figure 8:
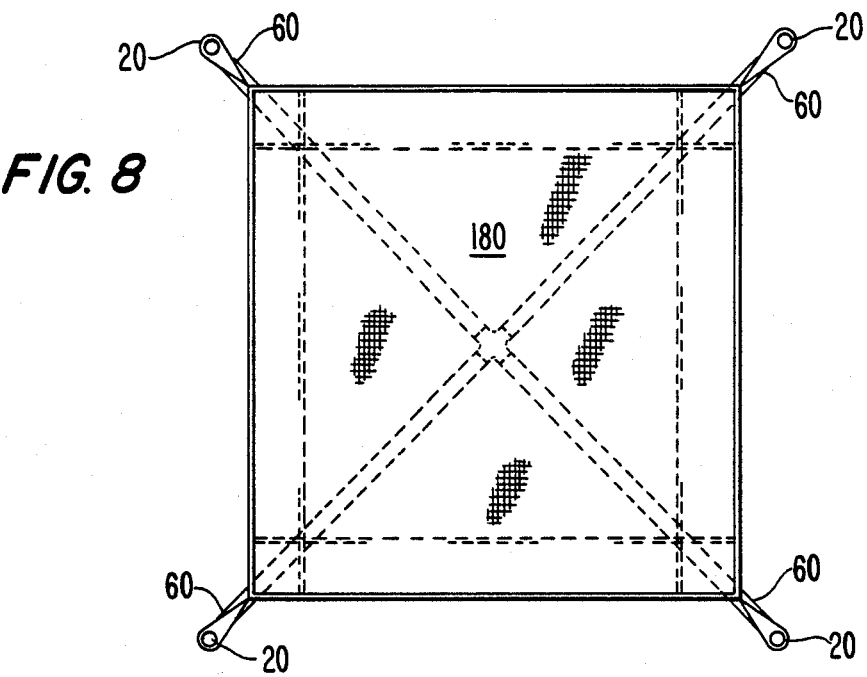
FIG. 8 is a plan view of the bottom of the playpen 10.

The bottom of the playpen 10 includes high strength reinforcing straps and a flexible cloth bottom 180 as illustrated in FIG. 8. The details of construction of the sides, bottom, frame, etc., of the portable playpen 10 can be found in U.S. application Ser. No. 551,104.

Figure 9:
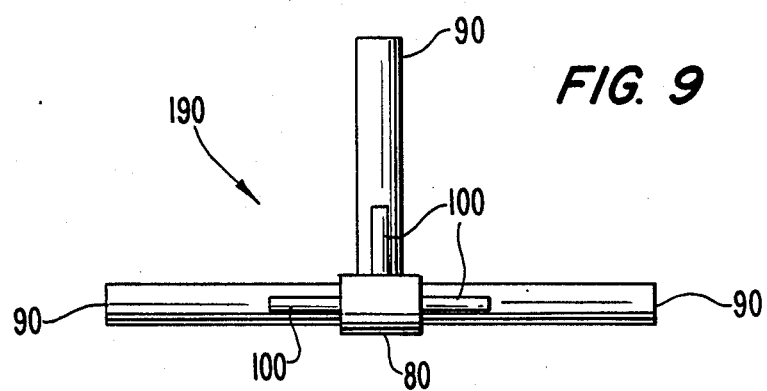
FIG. 9 illustrates a connector 190 according to the present invention suitable which is for use in a portable bed or cot.

FIG. 9 illustrates a further connector 190 which is suitable for a portable bed. The connector 190 is identical with the connectors illustrated in FIGS. 3 and 6 except that one of the rods 90 has been removed. The connector 190 is illustrated as a part of a portable bed 200 in FIG. 10. The portable bed includes a fabric bottom 210 and reinforcing straps 220 constructed in the same manner as the bottom illustrated in FIG. 8. The bedframe includes frame members 230 which have an L shape similar to the tubes 20 of FIG. 1. A center stress tube 240 is provided between the connectors 190 and applies a separating force to the ends of the bed 200.

Figure 10:
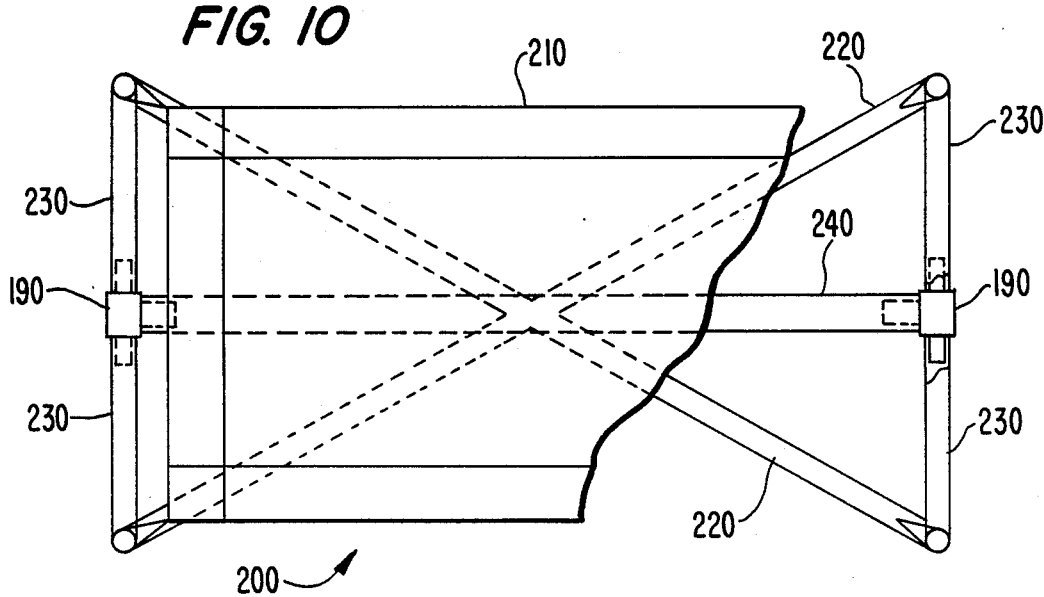
FIG. 10 illustrates a portable bed 200 including the connector 190 of FIG. 9.
Figure 11:
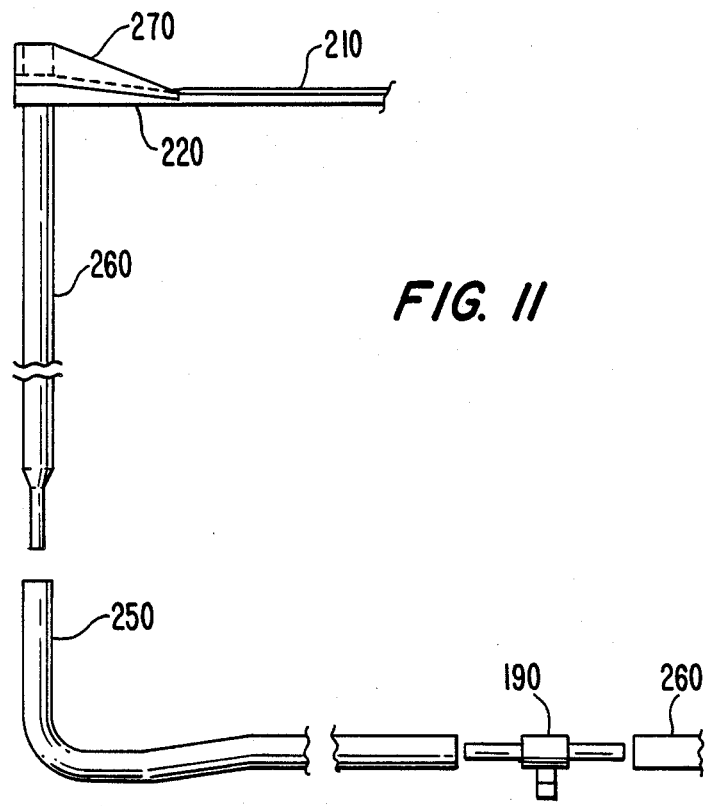
FIG. 11 illustrates the details of the portable bed 200 from the side.
Figure 12:
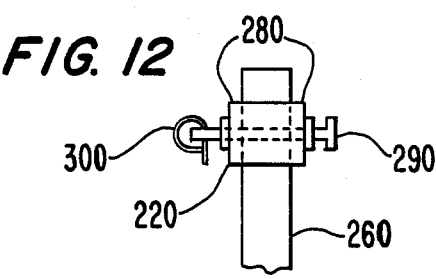
FIG. 12 illustrates an arrangement to prevent a strap 220 from sliding down tube 260.

FIG. 11 illustrates the details of the construction of the portable bed 200 of FIG. 10. The frame for each leg or corner of the bed 200 includes J-shaped tubes 250 interfacing with connector 190. The J-shaped tubes 250 slidably engage leg tubes 260. Over the end of the leg tube 260 fits strap 220 supporting fabric bottom 210. The strap 220 and fabric bottom 210 are sewn to closed ended sleeve 270. During assembly, the looped strap 220 and closed ended sleeve 270 fit over the end of tube 260 and the sleeve 270 prevents the strap 220 from sliding down the tube 260. The tube 260 should have a cap to prevent puncturing the sleeve 270 and the sleeve 270 could be reinforced with a strap across the top. Other methods are available for preventing the strap 220 from sliding down the tube 260 such as including a pair of gromets 280 in the strap 220 and a retaining pin 290 passing through the strap 220 and tube 260 as illustrated in FIG. 12. The pin 290 can be kept from slipping out the strap 220 by a slip ring 300. The use of gromets 280 and a retaining pin 290 provides added strength and durability with the disadvantage of extra weight and more parts resulting in a higher cost and a longer assembly time.

Figure 13:
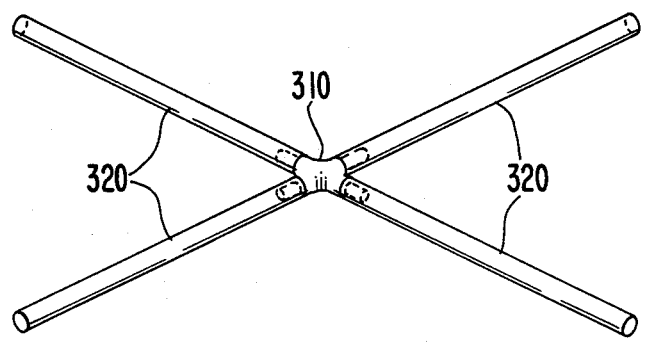
FIG. 13 illustrates another connector 240 and frame suitable for a portable bed.

FIG. 13 illustrates a further alternate embodiment of a connector 310 suitable for a portable bed. The frame tubes 320 have a L shape as discussed previously.

Figure 14:
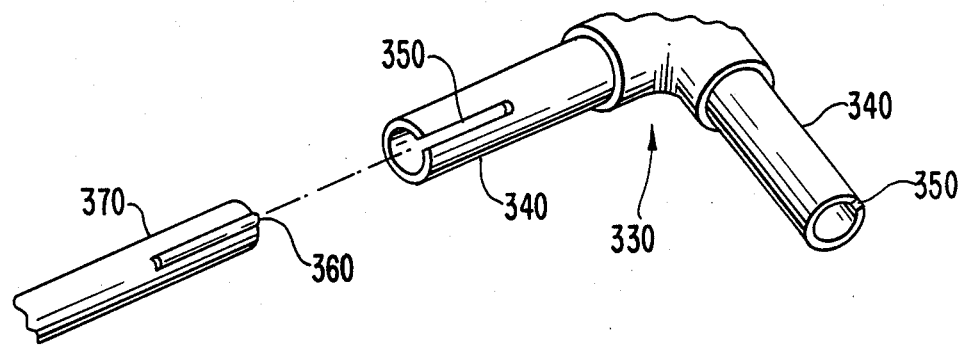
FIG. 14 illustrates an alternate version of a connector 260 which is hollow.

FIG. 14 illustrates another embodiment of the present invention in which the connector 330 includes hollow tubes 340 having key slots 350 which slidably engages key 360 of solid rod 370. Other changes can be made to the connector of the present invention such as providing a notch in the key slot and a protrusion or a spring locking arrangement loaded ball type lock which would engage the notch, thereby retarding removal of the tubes from the connector. A suitable ball spring can be found in association with ratchet wrenches.

Figure 15:
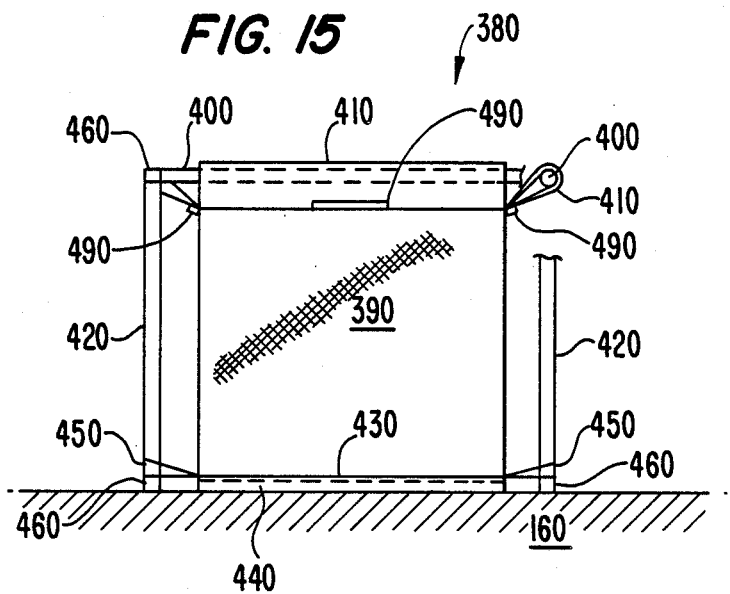
FIG. 15 is a side view of a playpen 380 suspended from horizontal tubes 400.
Figure 16:
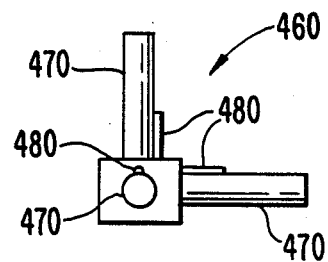
FIG. 16 illustrates a connector for the playpen 380 of FIG. 15.

FIG. 15 is a side view of an improved playpen 380. The playpen 380 differs from the playpen 10 of FIG. 1 by suspending a mesh box 390 inwardly of horizontal side tubes 400 by sleeves 410. FIG. 15 shows the sleeves inclined downwardly for convenience of illustration, however, the sleeves would normally be oriented substantially horizontal. The suspension of the compartment from the horizontal side tubes 400 provides better horizontal support for the sides, especially the top edge of each side where a baby can grab. The sleeves 410 can be substantially continuous along each side or be segmented. The horizontal side tubes connect to vertical tubes 420 which rest on the floor 150. A bottom horizontal tube 430 also rests on the floor making the frame a cube like structure. The bottom of the enclosure includes a pad 440 and side straps 450 to stabilize the bottom. A connector suitable for the playpen 380 of FIG. 15, is illustrated in FIG. 16, and includes rods 470 and keys 480.

Figure 17:
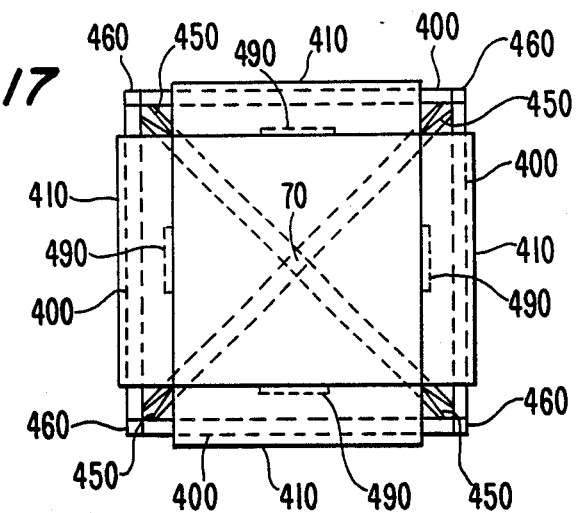
FIG. 17 is a view from the top of a horizontally suspended playpen having a cross like bottom frame.
Figure 18:
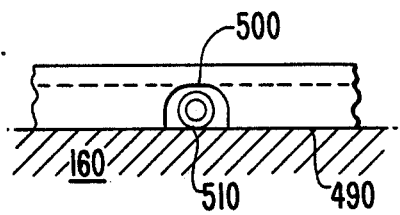
FIG. 18 is a pad used with the cross like bottom frame of FIG. 17.
Figure 19:
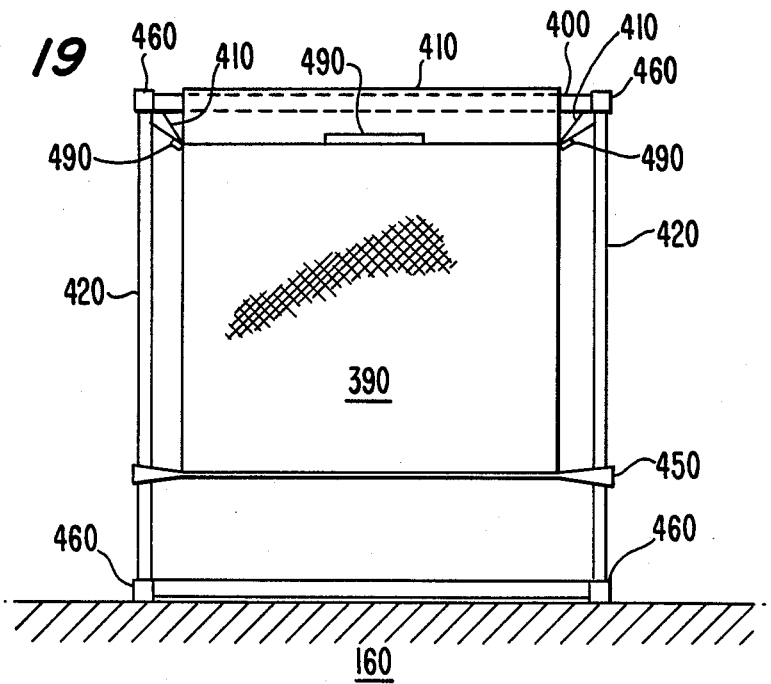
FIG. 19 illustrates a horizontally suspended playpen 380 suspended away from the floor 150.

FIG. 17 illustrates the enclosure 380 using a cross-like frame on the bottom. A connector 70 without a foot is used in the center. When bottom of the enclosure rests on the floor over the cross-like bottom frame a pad 490 with a tunnel 500 for a frame tube 510 is provided as illustrated in FIG. 18. The pad raises the bottom up so that the child does not contact the tube 570. A two layer pad is possible as indicated by the dashed line in FIG. 18. The bottom layer would be relatively hard and the top layer soft. Suitable materials are soft foam and hard foam. FIG. 19 illustrates the horizontally suspended compartment raised above the ground.

Illustrated in FIGS. 15, 17 and 19 is an elastic strap or web 490 which is provided to produce a force pulling inward on the horizontal support tubes 400 so that the frame will not come apart due to give in the sleeves 410 and mesh enclosure 390. That is, each elastic strap 490 pulls the connectors on each corner of the cube toward each other by pulling on the horizontal support tubes 400 oriented perpendicular to each elastic strap 490. This elastic strap 490 is needed to allow the fabric sleeves 410 to be slid over the tubes 400 during assembly and yet hold the top edge of the frame together. The strap 490 becomes particularly important in the version illustrated in FIG. 15 which rests on the floor because there is no component of the gravitational force on a suspended enclosure (as in FIG. 19) to apply a force to hold the frame together. The elastic strap 490 can be an ordinary elastic strip, however, such strips can become over-stretched and not povide the needed pulling force. A memory elastic strap provides preferred characteristics. That is, a memroy elastic strap will expand and always return to the same size unless the strap is stretched to the breaking point. Such a memory elastic strap is available as an Elasto Belt available in Milan, Italy. The strap 490 should be sewn onto the sleeve 410 in such a way that when the frame is assembled there is no gather in the sleeve 410. Although the strap 490 is shown sewn onto the outside of sleeve 410, it is possible to sew it on the inside of the sleeve 10 where the tube 400 is inserted or on the side of the sleeve 410 facing toward the interior of the mesh enclosure 390. Other methods are appropriate yet more costly to provide the force holding the top of the frame together. For example, a retaining pin arrangement similar to FIG. 12 where element 260 would be connector 460 and element 280 would be tube 400 could be used. It is also possible to make the entire or portions of sleeves 410 elastic.

Although a perpendicular bottom frame is shown using connectors 460 in FIG. 19, other embodiments are possible which curved frame members like the members 20 that form a cross under the compartment as illustrated in FIG. 1. It is also possible to have a cylindrical child enclosure embodiment using curved frame members using the horizontal inward suspension of the enclosure. It is also possible to suspend the playpen inwardly using the suspension of FIGS. 11 and 12.

Other types of portable furniture are possible using the suspension mechanisms and connectors of the present invention including a bassinet, a baby carrier, a stroller and a car seat. It is also possible to have a portable bed with a horizontally suspended bottom using combinations of the suspensions discussed above.

The many features and advantages of the present invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What I claim is:

1. A connector for connecting vertically oriented tubes each including a linear key slot and each having an end, said connector comprising:

solid metal rods coupled together and slidably engaging each tube and having a shoulder abutting the end of each tube; and a linear metal projection on each rod engaging the key slot and preventing tube rotation.

2. A connector as recited in claim 1, further comprising releasable brake means, attached to said rod, for applying a braking force to a surface adjacent to said rod and removing the breaking force when the rod is oriented non-parallel to the surface.

3. A connector as recited in claim 2, wherein said releasable brake means comprises a foot attached to and oriented perpendicular to said rod.

4. A connector as recited in claim 3, further comprising a friction tip attached to said foot.

5. A connector as recited in claim 1, wherein said metal is aluminum.

6. A connector for first and second tubes each including a linear key slot and each having an end, said connector comprising:

a first solid metal rod for slidably engaging the first tube and having a shoulder abutting the respective end;

a second solid metal rod attached to said first rod forming an angle therebetween, and for slidably engaging the second tube and having a shoulder abutting the respective end; and a linear metal projection on said first and second solid metal rods, engaging the key slots and preventing rotation of the first and second tubes.

7. A connector as recited in claim 6, wherein the angle is greater than or equal to ninety degrees.

8. A connector as recited in claim 6, wherein the angle is less than or equal to ninety degrees.

9. A connector as recited in claim 6, wherein said metal is aluminum.

10. A connector for abutting an adjacent surface and engaging plural tubes each having a key slot and an end, said connector comprising:

plural solid metal rods for slidably engaging the tubes, said rods coupled together and each rod including a linear metal key engaging the associated key slot and preventing rotation of the associated tube, and having a shoulder abutting the respective end; and a foot extending away from the coupling of said rods and including a braking surface for engaging the adjacent surface to prevent movement of said connector relative to the adjacent surface.

11. A connector as recited in claim 10, wherein said metal is aluminum.

12. A portable bed, comprising:

a disassemblable base frame comprising tubes each having a linear key slot and an end;

a connector for engaging said frame, said connector comprising plural solid rods for slidably engaging said tubes, said rods coupled together and each including a linear metal key engaging the respective key slot and preventing rotating of the respective tube, and having a shoulder abutting the respective end;

a bottom panel having straps for slidably engaging the frame; and means, coupled between the straps and said frame, for preventing downward movement of said bottom panel along said frame.

13. A bed as recited in claim 12, wherein said means comprises a closed ended sleeve attached to said strap and engaging the frame.

14. A bed as recited in claim 12, wherein said frame includes a hole and said means comprises:
  a pair of gromets fixed in said strap; and
  a retaining pin passing through the pair of gromets and the hole.

15. A bed as recited in claim 12, wherein said metal is aluminum.

16. A child enclosure, comprising:
  a disassemblable frame comprising tubes each having an end;
  a connector for coupling said tubes and including: means for engaging the tubes and preventing tube rotation; and means for abutting each respective end; and
  a box-like fabric enclosure suspended from said frame.

17. A child enclosure as recited in claim 16, wherein said tubes include linear key slots and said connector comprises coupled solid metal rods with linear metal keys for slidably engaging the key slots and preventing the tubes from rotating.

18. A child enclosure as recited in claim 16, wherein said enclosure rests on a supporting surface and the frame rests on the supporting surface.

19. A child enclosure as recited in claim 16, wherein said frame forms a cross-like structure under said box-like enclosure and said box-like enclosure includes a bottom having a pad with tunnels for the cross-like structure.

20. A child enclosure as recited in claim 16, wherein said frame includes a top edge and said child enclosure further comprises means for holding the top edge of the frame together.

21. A child enclosure as recited in claim 16, wherein said frame includes horizontal top tubes supporting the box-like fabric enclosure and said child enclosure further comprises means for applying a horizontal force to oppositely oriented horizontal top tubes.

22. A child enclosure as recited in claim 21, wherein said means comprises memory elastic coupled between the oppositely oriented horizontal tubes.

23. A bed as recited in claim 17, wherein said metal is aluminum.

24. A connection arrangement, comprising:
  vertically oriented tubes each having a key slot, said key slot comprising an elongated continuous linear opening extending only in an axial direction of the respective one of said tubes;
  solid rods coupled together and slidably engaging each tube and having a diameter, the elongated continuous linear opening of said key slot having a length at least a substantial fraction of the diameter; and
  a slot shaped projection on each rod engaging said key slot, preventing tube rotation and having a length in the slot direction of a substantial fraction of the diameter and confronting said key slot along the length.

25. A connector arrangement, said connector arrangement comprising:
  first and second tubes each having a key slot, said key slot comprising an elongated continuous linear opening extending only in an axial direction of the respective one of said first and second tubes;
  a first rod having a diameter and for slidably engaging the first tube;
  a second rod having the diameter and for slidably engaging the second tube; and
  a slot shaped projection on said first and second rods, engaging the key slots, preventing tube rotation and having a length in the slot direction of a substantial portion of the diameter and confronting said key slot along the length, the elongated continuous linear opening of said key slot having a length of at least a substantial portion of the diameter.

26. A connector arrangement, comprising
  vertically oriented tubes each including a key slot and each having a wall thickness, said key slot comprising an elongated continuous linear opening extending only in an axial direction of the respective one of said tubes and having a length at least substantially greater than the wall thickness;
  solid rods coupled together and slidably engaging each tube and having a diameter; and
  a slot shaped projection on each rod engaging said key slot, preventing tube rotation and having a length in the slot direction substantially greater than the wall thickness of the tubes and confronting said key slot along the length.

27. A connector arrangement, comprising:
  first and second tubes each including a key slot and each having a wall thickness, said key slot comprising an elongated continuous linear opening extending only in an axial direction of the respective one of said first and second tubes and having a length at least substantially greater than the wall thickness;
  a first rod having a diameter and for slidably engaging the first tube;
  a second rod having the diameter and for slidably engaging the second tube; and
  a slot shaped projection on said first and second rods, engaging the key slots, preventing tube rotation and having a length in the slot direction substantially greater than the wall thickness of the tubes and confronting said key slot along the length.

28. A connector arrangement, comprising:
  vertically oriented tubes each including a key slot and each having a wall thickness, said key slot comprising an elongated continuous linear opening extending only in an axial direction of the respective one of said tubes and having a length at least three times the wall thickness;
  solid rods coupled together and slidably engaging each tube and having a diameter; and
  a slot shaped projection on each rod engaging said key slot, preventing tube rotation and having a length in the slot direction at least three times the wall thickness of the tubes and confronting said key slot along the length.

29. A connector arrangement, comprising:
  first and second tubes each including a key slot each having a wall thickness, said key slot comprising an elongated continuous linear opening extending only in an axial direction of the respective one of said first and second tubes and having a length at least three times the wall thickness;
  a first rod having a diameter and for slidably engaging the first tube;
  a second rod having the diameter and for slidably engaging the second tube; and
  a slot shaped projection on said first and second rods, engaging the key slots, preventing tube rotation and having a length in the slot direction three times the wall thickness of the tubes and confronting said key slot along the length.

* * * * *